United States Patent
An

(10) Patent No.: US 7,450,610 B2
(45) Date of Patent: Nov. 11, 2008

(54) APPARATUS AND METHOD FOR ALLOCATING CHANNEL TIME TO APPLICATIONS IN WIRELESS PAN

(75) Inventor: Cheol-hong An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 861 days.

(21) Appl. No.: 10/858,372

(22) Filed: Jun. 2, 2004

(65) Prior Publication Data

US 2005/0013267 A1 Jan. 20, 2005

Related U.S. Application Data

(60) Provisional application No. 60/488,444, filed on Jul. 21, 2003.

(30) Foreign Application Priority Data

Jun. 3, 2003 (KR) ...................... 10-2003-0035777

(51) Int. Cl.
*H04J 3/16* (2006.01)
(52) U.S. Cl. ...................... 370/468; 370/252
(58) Field of Classification Search ................ 370/468, 370/252, 253, 336, 347; 709/223–226
See application file for complete search history.

(56) References Cited

U.S. PATENT DOCUMENTS

| 5,818,820 A | 10/1998 | Anderson et al. |
| 6,980,541 B2 * | 12/2005 | Shvodian ..................... 370/346 |
| 7,127,254 B2 * | 10/2006 | Shvodian et al. ............ 455/450 |
| 7,280,801 B2 * | 10/2007 | Dahl .......................... 455/41.2 |
| 2002/0105970 A1 | 8/2002 | Shvodian |

(Continued)

FOREIGN PATENT DOCUMENTS

JP 07-050670 A 2/1995

(Continued)

OTHER PUBLICATIONS

Samsung Electronics: "Multi-Band Performance Tradeoffs", IEEE 802.15-03-209R3, 'Online!, May 2003, p. 1-26, XP002309799.

(Continued)

*Primary Examiner*—Ricki Ngo
*Assistant Examiner*—Gary Mui
(74) *Attorney, Agent, or Firm*—Sughrue Mion, PLLC

(57) ABSTRACT

An apparatus and method for allocating channel time for each application in a single superframe when applications such as wireless USB and IEEE 802.2, which are implemented in a MAC layer, coexist on a wireless PAN. The apparatus includes a beacon generating module for generating a superframe; a duration adjusting module for adjusting a duration of the superframe to be a multiple of a frame of an upper application layer of a device; a channel time dividing module for comparing an allowable size of maximum CTA in the frame of the upper application layer of the device with a size of isochronous CTA of another device and dividing the CTA, if necessary; and a channel time relocating module for comparing a super-rate of CTA previously located in the superframe with a super-rate of CTA to be newly added and relocating the newly added CTA.

17 Claims, 4 Drawing Sheets

U.S. PATENT DOCUMENTS

| | | | |
|---|---|---|---|
| 2002/0126692 A1 | 9/2002 | Haartsen | |
| 2003/0007453 A1 | 1/2003 | Ogier et al. | |
| 2003/0031146 A1* | 2/2003 | Sugaya | 370/336 |
| 2003/0152059 A1* | 8/2003 | Odman | 370/338 |
| 2003/0193963 A1* | 10/2003 | Wright et al. | 370/442 |
| 2004/0013127 A1* | 1/2004 | Shvodian | 370/442 |
| 2004/0058686 A1* | 3/2004 | Odman | 455/450 |

FOREIGN PATENT DOCUMENTS

| | | |
|---|---|---|
| JP | 2000-156698 A | 6/2000 |
| JP | 2001-237910 A | 8/2001 |
| JP | 2003-008579 A | 1/2003 |
| JP | 2003-51826 A | 2/2003 |
| KR | 2002-0047181 A | 6/2002 |
| WO | WO 01/71981 A2 | 9/2001 |
| WO | WO 03/030459 A2 | 4/2003 |

OTHER PUBLICATIONS

Xtremespectrum & Appairent Technologies:, "802.15.3 Overview/Update", The Wimedia Alliance, 'Online!, Oct. 2002, p. 1-23, XP002309800.

Xtreme Spectrum: "A proposal for MAC Improvements for fairness and power saving", IEEE 802.15-01-120R0, 'Online!, Feb. 8, 2001, pp. 1-16, XP002292393.

Appairent Technologies: "TG3 SB1 text for various resolution", IEEE P802.15-03-059R2, 'Online!, Feb. 8, 2003, pp. 1-14, XP002292394.

A. Gummalla et al;, "Wireless medium Access Procotols", 'Online! 2000, pp. 2-15, XP002292395.

Broadcom Corp.: "Draft of Clause 7 for TG-MAC", IEEE 802.15-01-034R2, "Online! Mar. 2001, pp. 1-27, XP002292396.

* cited by examiner

APPARATUS AND METHOD FOR ALLOCATING CHANNEL TIME TO APPLICATIONS IN WIRELESS PAN

This application claims the priority of Korean Patent Application No. 10-2003-0035777 filed on Jun. 3, 2003, with the Korean Intellectual Property Office, and U.S. Provisional Patent Application No. 60/488,444 filed on Jul. 21, 2003, with the United States Patent and Trademark Office, the disclosures of which are incorporated herein by reference.

BACKGROUND OF THE INVENTION

1. Field of the Invention

Apparatuses and methods consistent with the present invention relate to allocating channel time for communication between wireless devices in a wireless PAN (Personal Area Network). More particularly, the present invention relates to an apparatus and method for allocating channel time for each application in a single superframe when applications such as wireless USB and IEEE 802.2, which are implemented in a MAC layer, coexist on a wireless PAN.

2. Description of the Related Art

Due to the progress of digital technology, many digital products such as DVD players, cable STBs (SetTop Boxes), DVCRs (Digital Video Cassette Recorders), DTVs (Digital TVs) and PCs (Personal Computers) are interconnected on a single network. Various protocols can be implemented in such equipment in order to transmit or receive AV data to or from other equipment. When these various protocols are to be transmitted in a wireless PAN (Personal Area Network), a method of sharing a wireless medium is required.

FIG. 1 is a diagram showing the channel time allocation structure of a superframe that a related art piconet coordinator (PNC) generates. Referring to FIG. 1, the channel time allocation (CTA) structure is divided into two layers. An upper layer shows the time-based structure of continuous frames of an upper application layer, and a lower layer shows the time-based structure of a superframe of a MAC layer for wireless communication. It is noted that "application" as used in the specification refers to interfaces or standards and "application layer" as used in the specification does not refer to the application layer in the Open Systems Interconnect (OSI) Model. The upper application layer is configured such that data are directly transmitted from the upper application layer without the MAC layer in existing wired communication. In the case of wireless communication, the data are transmitted from the upper application layer through the lower MAC layer and the received data are transferred back to the upper application layer through the lower MAC layer. That is, the structure shown in FIG. 1 can be obtained by combining an upper application layer used in existing wired communication with a MAC layer required in wireless communication.

According to such a structure, isochronous transaction should be transmitted every frame for applications having a very short frame period, e.g., a wireless USB device. Further, if a large CTA (CTA #6) is allocated from another device, data cannot be transmitted during this period. Thus, the data in this period should be buffered. Furthermore, since the size of the buffer-generating CTA is not determined, it is impossible to know how much buffer is needed for a device. In addition, if the superframe duration is not coincident with a multiple of the frame size, this also acts as a factor hindering periodic transmission. In an example of FIG. 1, since the frame #9 is a broken frame, it cannot normally transmit data related thereto.

SUMMARY OF THE INVENTION

Accordingly, the present invention is conceived to solve the above problems in the related art. An aspect of the present invention is to provide a method for allocating channel time for each application in a single superframe when an application for wireless USB implemented in a MAC layer, an application of IEEE LAN protocol 802.2 specifying an implementation type of a Logical Link Control Sub Layer (LLC sub layer) of a Data-Link Layer, and the like coexist on a wireless PAN.

Further, another aspect of the present invention is to provide a method for efficiently allocating channel time in a superframe in consideration of the relationship between a transaction frame supplied from the applications and a superframe of a MAC layer.

According to an aspect of the present invention for achieving the aspects, there is provided an apparatus for allocating channel time to an application on a wireless personal area network (PAN), comprising a beacon generating module for generating a superframe within a beacon period; a duration adjusting module for adjusting duration of the superframe so that the duration becomes a multiple of duration of a frame of an upper application layer of a device; a channel time dividing module for comparing an allowable size of maximum CTA in the frame of the upper application layer of the device with a size of isochronous CTA of another device and dividing the CTA, if necessary; and a channel time relocating module for comparing a super-rate of CTA previously located in the superframe with a super-rate of CTA to be newly added and relocating the newly added CTA.

According to another aspect of the present invention, there is provided a method for allocating channel time to an application on a wireless PAN, comprising the steps of (1) adjusting duration of a superframe to be a multiple of duration of a frame; (2) comparing a size of maximum CTA with a size of an isochronous CTA of a requesting device to efficiently locate the CTA in the adjusted superframe; and (3) if it is determined that the size of the isochronous CTA of the requesting device is greater than an allowable size of the maximum CTA in the frame of the upper application layer, dividing the isochronous CTA by a value obtained by adding 1 to a quotient of the size of the isochronous CTA divided by the size of the maximum CTA.

BRIEF DESCRIPTION OF THE DRAWINGS

The above and other aspects, features and other advantages of the present invention will become apparent from the following description of an exemplary embodiment given in conjunction with the accompanying drawings, in which.

DETAILED DESCRIPTION OF THE INVENTION

Hereinafter, an exemplary embodiment of the present invention will be described in detail with reference to the accompanying drawings.

Figure 2A:
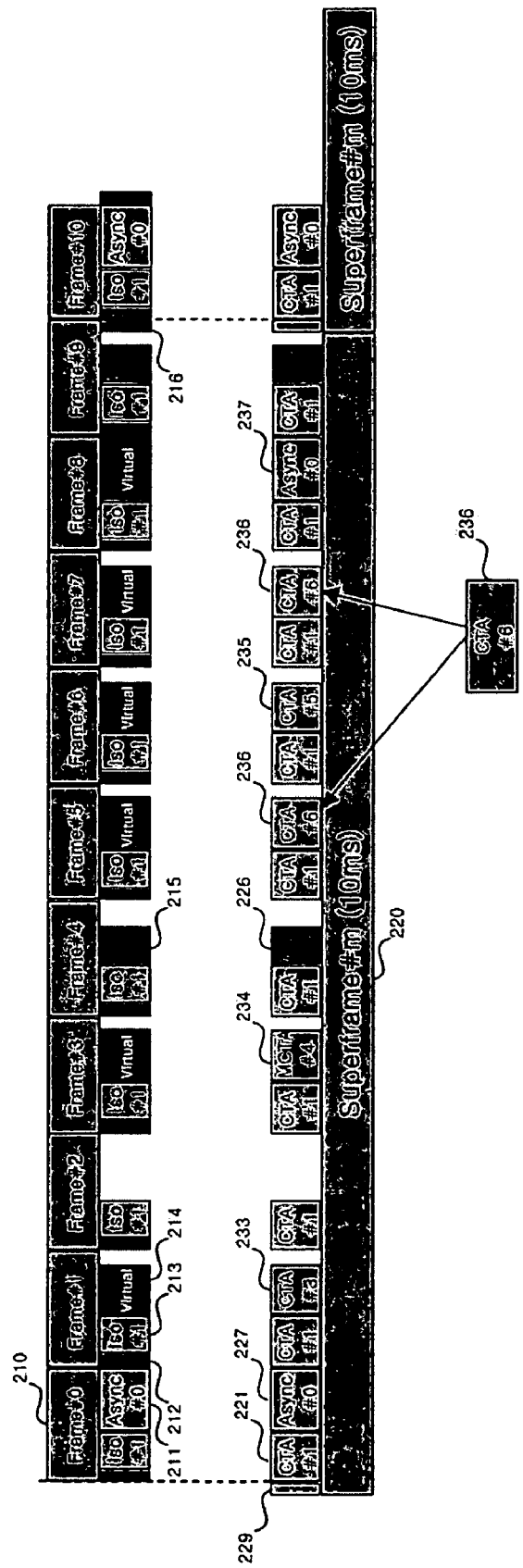
FIG. 2a is a diagram showing the CTA allocation structure of a superframe generated by a PNC according to the present invention.

FIG. 2A is a diagram showing a channel time allocation (CTA) structure of a superframe generated by a piconet coordinator (PNC) according to the present invention. Referring to this figure, the upper layer shows a structure of a frame 210 of a layer in which an application for wireless USB or IEEE 802.2 exists and the lower layer shows a structure of a superframe 220 existing in a level of a MAC layer, in the form of a time-based structure. In this exemplary embodiment, it is assumed that the applications for wireless USB and IEEE 802.2 coexist. In a frame for wireless USB, an isochronous channel and interrupt channel are generated periodically and an asynchronous channel also exists. In the exemplary embodiment, the duration of a superframe is set to 10 ms and the duration of a frame is set to 1 ms. As a result, ten frames exist within one superframe. The superframe begins from a beacon 229 where serial numbers are numbered in the order of beacons. A beacon period is set to begin at RES of the upper application layer (non-periodic save area; 292 of FIG. 2B), and a start of the CTA #1 221 is set to be coincident with a start of the frame #0 210.

In the superframe 220, serial numbers such as #1 and #2 numbered in the CTA represent Stream Indexes that are used to determine the equality of data. Thus, the same Stream Index represents a stream of the same data, and different Stream Index represents a stream of different data.

A start of frame 212 shown in this figure is a portion for indicating a start of frame for each frame 210.

For isochronous transaction, isochronous CTA is allocated to the wireless USB device from the PNC by the number of frames of an upper application existing in a period of one superframe. In this example, a portion of ISO #1 of the upper layer shows CTA #1 221 in the lower superframe, of which the super-rate value is 10.

In the case of an interrupt transaction, the interval of the frame where the interrupt transaction should exist is calculated and allocated from the PNC. In this example, since the interrupt transaction should exist every five frames, two isochronous channel times are allocated from the PNC. INT (which means the interrupt transaction) of the upper layer is shown as an isochronous CTA in the lower layer. However, the INT is shown in every periodic frame interval in the frame, whereas it is shown twice per superframe. This is because the INT is not the interrupt transaction but the isochronous CTA of which the super-rate value is 2.

In the meantime, when a source ID of the allocated CTA is not a device ID of its own, it is processed such that scheduling is virtually generated in the frame. For example, a device for executing the 802.2 application other than the wireless USB device is allocated channel time by the PNC. That is, a portion of the frame is allocated in view of the wireless USB device, but a real transaction does not occur. Thus, such a portion is shown as a Virtual Traffic period 214.

Asynchronous transaction 211 of the upper layer occupies an empty portion in one frame (a portion outside of the isochronous transaction portion), and asynchronous CTA 227 of the lower layer occupies an empty portion in one entire superframe.

Figure 1:
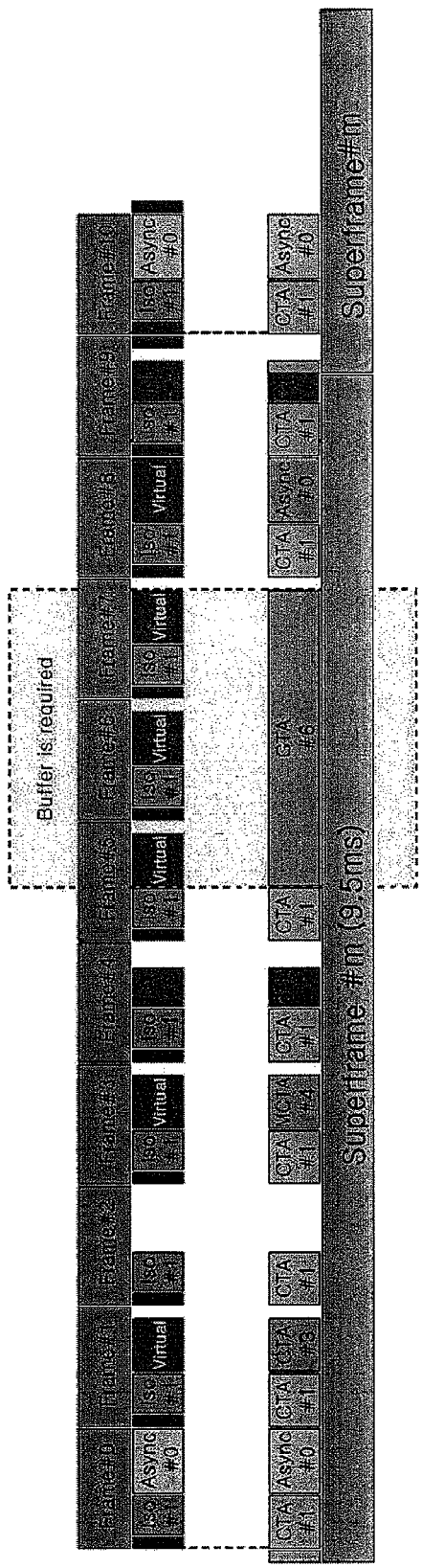
FIG. 1 is a diagram showing the CTA allocation structure of a superframe that a related art piconet coordinator (PNC) generates.

Further, reference numerals 233, 234, 235, 236 and 237 represent CTA of another device, contrary to the other CTA. Among them, CTA #6 236 is originally requested as a single CTA but is divided into two CTAs in order to avoid the problems described in connection with FIG. 1.

Figure 2B:
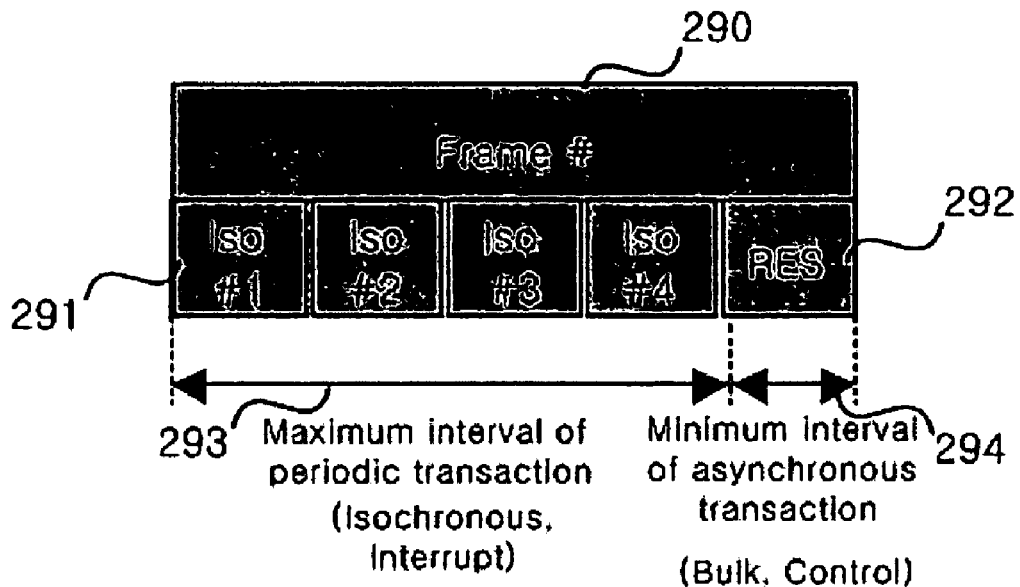
FIG. 2b is a diagram showing the structure of a unit frame that a device application generates.

FIG. 2B is a diagram showing the structure of a unit frame generated by a device application. In a case where the duration of a frame 290 of the application is 1 ms as illustrated in FIG. 2A, if a data transfer rate of 20 Mbps is required in a device having a physical layer of 100 Mbps, an ISO (Isochronous) slot 291 for performing such data transmission should be 0.2 ms. Each frame of the application has a maximum ratio of periodic transaction limited for non-periodic or asynchronous transaction. Accordingly, when the device is allocated isochronous channel time by the PNC, it must ensure that the channel time does not exceed this maximum ratio. Further, the PNC should not allocate isochronous CTA to the frame. As shown in this figure, the sum of the ISO slots does not exceed a maximum interval 293 of a periodic transaction. The other portion, which is not occupied by the ISO slots, remains a RES 292 (non-periodic save area), so that asynchronous transactions can be available in an interval corresponding to the RES.

In FIG. 2B, isochronous and interrupt transactions belong to a periodic transaction, whereas bulk and control transactions belong to a non-periodic (asynchronous) transaction. First, the isochronous transaction is a periodic transaction and corresponds to continuous communication made between a host and a device. Such a mode is generally needed for a case (e.g., video stream, etc.) where data transmission should be made at the almost same speed as that of an original data stream. Second, the interrupt transaction corresponds to a transaction that is periodic but does not appear every frame but rather at a constant frame interval. Third, the control transaction is bursty and non-periodic, and uses a request/response communication initiated by the host software. Finally, the bulk transaction is a non-periodic data transmission that uses all available bandwidths when they are available and is delayed until the bandwidths become available if they are not otherwise available immediately.

Figure 3:
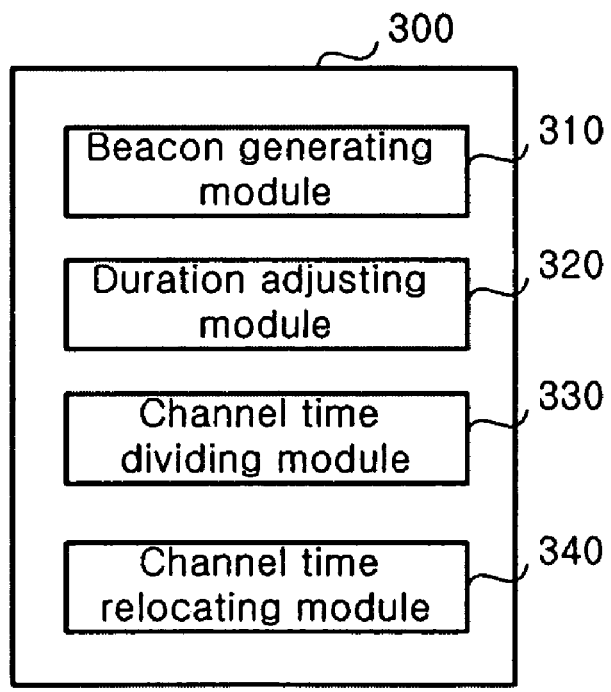
FIG. 3 is a module diagram of an apparatus for generating a new superframe to implement the present invention.

FIG. 3 is a module diagram showing an apparatus 300 for allocating channel time according to the present invention. The apparatus 300 can be operated in a state where it is embedded in a PNC. The apparatus 300 comprises a beacon generating module 310, a duration adjusting module 320, a channel time dividing module 330, and a channel time relocating module 340.

The beacon generating module 310 generates and transmits a superframe, which has been proposed in the present invention, within a beacon period. A detailed description on the superframe was made in connection with FIGS. 2A and 2B, and thus, it will be omitted herein.

The duration adjusting module 320 adjusts the duration of the superframe so that the duration becomes approximately equal to an integral multiple of the duration of a frame of an upper application layer of a device. That is, the duration of the superframe is divided by the duration of the frame of the upper application layer. Then, if the superframe duration is not approximately equal to an integral multiple of the frame duration, the adjusting module 320 requests that the PNC adjust the duration of the superframe. Accordingly, the PNC adjusts the superframe duration and then feeds back the adjusted duration value as a response. In FIG. 2A, the duration of the superframe is set to 10 ms and the duration of the frame is set to 1 ms. As a result, ten frames exist in one superframe.

As described above, if the duration of the superframe is not set to be approximately equal an integral multiple of the duration of the frame, it may function as a factor hindering periodic transmission. That is, a broken frame may be generated in a portion where the end point of a superframe is not coincident with the end point of any one of the frames, and thus, data corresponding to the broken frame cannot be properly transmitted.

The channel time dividing module 330 compares the allowable size of the maximum CTA in the frame of the upper application layer of the device with the size of the isochronous CTA of another device and divides the CTA, if necessary. More specifically, the channel time dividing module 330 determines whether the CTA that the device requested from the PNC is isochronous or asynchronous. Then, if it is isochronous, the module compares the requested CTA with totally available CTA to determine whether the requested CTA is available. If it is determined that the requested CTA is not available, the module sends a response "not available bandwidth" to the requesting device. Otherwise, the module compares the size of the requested CTA with the size of the maximum CTA (for example, the size of a single ISO shown in FIG. 2B), i.e., the CTA for the maximum data that can be isochronously transmitted in each frame for AV transmission such as wireless USB or wireless 1394. If a value of the requested CTA is greater than that of the maximum CTA, the requested CTA is divided by a value obtained by adding 1 (one) to the quotient of the size of the requested CTA divided by the size of the maximum CTA and changed into super-rated CTAs equal in number to the divided CTAs.

The channel time relocating module 340 compares the super-rate of a current CTA, and then either relocates the current CTA if the super-rate of the current CTA is greater than that of an existing CTA or relocates the current CTA by merely appending it to the existing CTA if the super-rate of the current CTA is less than that of the existing CTA.

Figure 4:
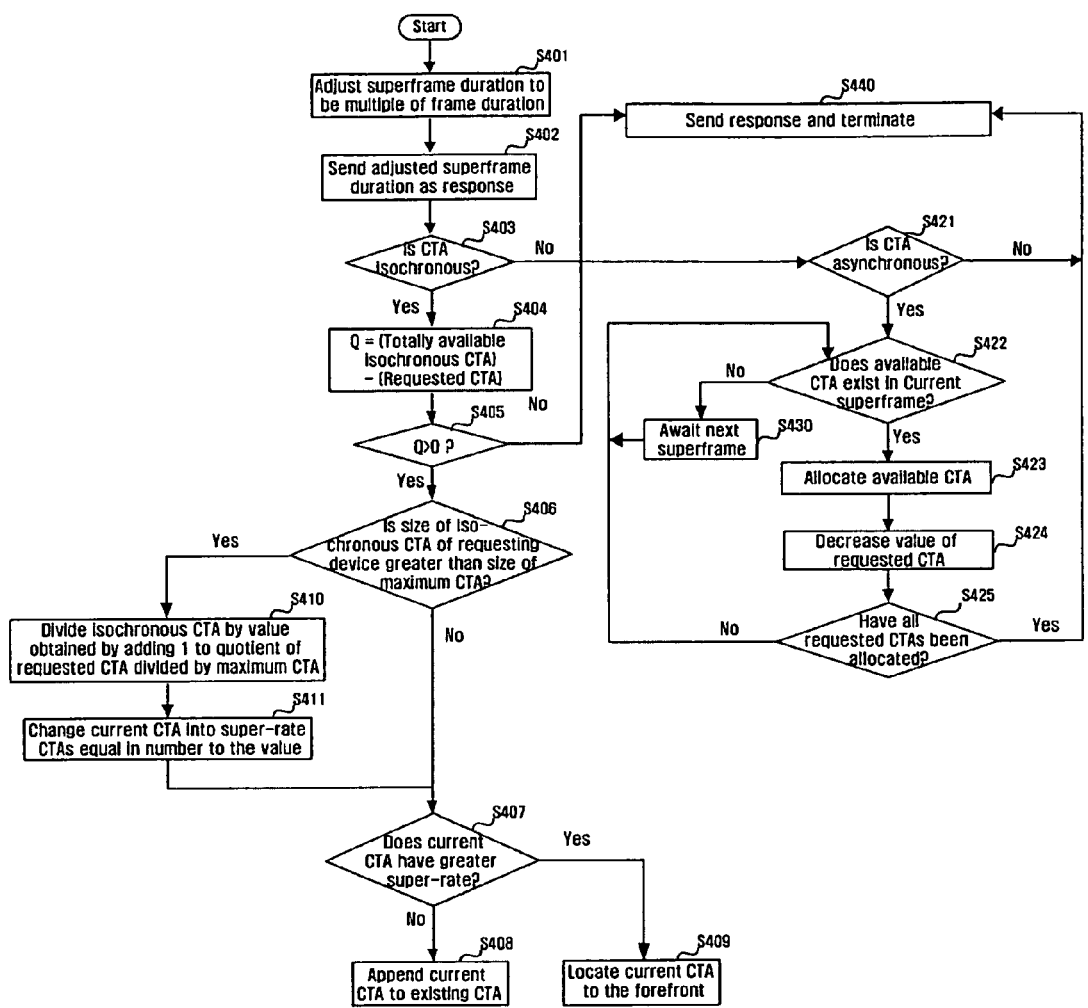
FIG. 4 is a flowchart specifically illustrating a method for implementing the present invention.

FIG. 4 is a flowchart specifically illustrating a method for implementing the present invention.

First, based on information on the superframe duration generated from the PNC, the duration of a superframe in the MAC layer is divided by the duration of frame of the upper application layer. At this time, the superframe duration should be set to be approximately equal to an integral multiple of the frame duration. If the superframe duration is not approximately equal to an integral multiple of the frame duration, a request is sent to the PNC to adjust the superframe duration. Accordingly, the PNC adjusts the superframe duration (S401) and the requested value is returned as a response (S402).

At this time, the PNC determines whether the requested CTA is isochronous or asynchronous (S403). If the requested CTA is isochronous, it is compared with the totally available CTA to determine whether it is available (S404 and S405). If it is determined that the requested CTA is not available, a response "not available bandwidth" is sent to the requesting device (S440). Otherwise, the size of the requested CTA is compared with the size of the maximum CTA (for example, the size of a single ISO shown in FIG. 2*b*), i.e. the CTA for the maximum data that can be isochronously transmitted in each frame for the AV transmission such as wireless USB or wireless 1394 (S406). If the requested CTA is greater than the maximum CTA, the number of times the requested CTA is greater than the maximum CTA is calculated and the requested CTA is changed into a number of isochronous super-rate CTAs. In other words, the size of the isochronous CTA is divided by the value obtained by adding 1 (one) to the quotient of the size of the requested CTA divided by the size of the maximum CTA (S410) as a resulting value. Then, the requested CTA is changed into super-rate CTAs equal in number to the resulting value (S411). If the requested CTA is less than the maximum CTA, the corresponding isochronous CTA is allocated thereto.

In the case of super-rate allocation, CTA is allocated with a higher priority as its super-rate becomes higher. That is, the super-rate value of a superframe of the CTA is compared (S407), and it is required that the CTA with a higher super-rate be first located and the CTA with a lower super-rate follow. In the case of wireless USB, the interrupt transaction is always executed after the isochronous transaction has been executed. To this end, the CTA for isochronous transaction should be first located as compared with the CTA for interrupt transaction. Thus, if the super-rate of the current CTA is greater than that of the existing CTA, the current CTA should be relocated ahead of the existing CTA (S409). If the super-rate of the current CTA is less than that of the existing CTA, the current CTA is relocated by merely appending it to the existing CTA (S408).

In the case of the asynchronous CTA request, it is determined whether an available CTA area exists in the superframe. If it is determined that an available area exists, the asynchronous channel time is allocated to the area (S423), and the requested CTA value is then decreased by the allocated channel time (S424). Further, the allocation is repeated until all the requested CTAs have been allocated (S425). If it is determined that the available area does not exist, the next superframe is awaited and the same operation will be performed (S430).

As described above, according to the present invention, since a method for efficiently allocating channel time is proposed when applications for wireless USB and 802.2 coexist on a wireless PAN, maximum isochronous characteristics can be ensured when the applications execute transactions. Therefore, there is an advantage in that AV streams, etc., can be stably transmitted.

Although the exemplary embodiment of the present invention has been disclosed for illustrative purpose, the present invention is not limited thereto. It is apparent to those skilled in the art that various changes and modifications can be made without departing from the scope and spirit of the invention as defined in the appended claims.

What is claimed is:

1. An apparatus for allocating channel time to an application on a wireless personal area network (PAN), comprising:
   a duration adjusting module for adjusting a first duration of a superframe so that the first duration becomes substantially equivalent to a multiple of a second duration of a frame of an upper layer of a device;
   a channel time dividing module for comparing an allowable size of a maximum channel time allocation (CTA) in the frame of the upper layer of the device with a size of an isochronous CTA of another device and dividing the isochronous CTA into a plurality of CTAs, according to the size of the isochronous CTA of the other device; and
   a channel time relocating module for comparing a second super-rate of a second CTA previously located in the superframe with a first super-rate of a first CTA, of the plurality of the CTAs, to be newly added and relocating the first CTA.

2. The apparatus as claimed in claim 1, wherein if the size of the isochronous CTA of the other device is greater than the allowable size of the maximum CTA in the frame of the upper layer of the device, the channel time dividing module is configured to divide and relocate the isochronous CTA by a value obtained by adding 1 (one) to a quotient of the isochronous CTA divided by the allowable size of the maximum CTA in the frame of the upper layer of the device.

3. The apparatus as claimed in claim 1, wherein after the second super-rate of the second CTA previously located in the superframe is compared with the first super-rate of the first CTA to be newly added, the channel time relocating module is configured to relocate one of the first CTA and second CTA with a higher super-rate ahead of another of the first CTA and second CTA with a lower super-rate.

4. The apparatus as claimed in claim 1, wherein a beacon for indicating a start of the superframe to be generated within a beacon period is generated in a non-periodic save area of the frame.

5. The apparatus as claimed in claim 1, wherein a third CTA not allocated to the device due to the isochronous CTA of the other device, is recognized to be virtually occupied in the frame, and transactions of the device are not generated from the third CTA.

6. The apparatus as claimed in claim 1, wherein a variety of types of CTA are uniformly distributed in the superframe.

7. The apparatus as claimed in claim 1 further comprising a beacon generating module for generating the superframe within a beacon period.

8. The apparatus as claimed in claim 1, wherein the multiple is an integer multiple.

9. The apparatus as claimed in claim 1, wherein if the size of the isochronous CTA of the other device is not greater than the allowable size of the maximum CTA in the frame of the upper layer of the device, the channel time dividing module is configured not to divide the isochronous CTA, and the channel time relocating module is configured to compare the second super-rate of the second CTA with a first super-rate of the isochronous CTA to dispose the isochronous CTA in the superframe.

10. A method for allocating channel time to an application on a wireless personal area network (PAN), comprising:
    adjusting a first duration of a superframe to be substantially equivalent to a multiple of a second duration of a frame to output an adjusted superframe;
    comparing a size of a maximum channel time allocation (CTA) in a frame of an upper layer with a size of an isochronous CTA of a requesting device to efficiently locate the isochronous CTA in the adjusted superframe; and
    if it is determined that the size of the isochronous CTA of the requesting device is greater than an allowable size of the maximum CTA in the frame of the upper layer, dividing the isochronous CTA by a value obtained by adding 1 to a quotient of the size of the isochronous CTA divided by the size of the maximum CTA.

11. The method as claimed in claim 10, further comprising:
    comparing a second super-rate of existing CTA previously located in the superframe with a first super-rate of first CTA to be newly added; and
    locating the first CTA ahead of the existing CTA when it is determined that the first super-rate of the first CTA is greater than the second super-rate of the existing CTA, or appending the first CTA to the existing CTA when the first super-rate of the first CTA is less than the second super-rate of the existing CTA.

12. The method as claimed in claim 10, further comprising, between the adjusting the first duration of the superframe and the comparing the size of the maximum CTA:
    comparing a size of total available isochronous CTA with a size of a requested CTA requested by the device when the requested CTA is isochronous; and
    sending a response to the requesting device and terminating channel allocation when it is determined that the requested CTA is greater than the total available isochronous CTA, or comparing the size of the maximum CTA when the requested CTA is less than the total available isochronous CTA.

13. The method as claimed in claim 10, further comprising, between the adjusting the first duration of the superframe and the comparing the size of the maximum CTA:
    determining, when a requested CTA requested by a device is asynchronous, whether available CTA exists in the adjusted superframe and then allocating the available CTA, as an allocated CTA, if the available CTA exists;
    decreasing the requested CTA by a value of the allocated CTA; and
    repeating the determining and the decreasing when the requested CTA remains, or sending a response to the requesting device when the requested CTA does not remain.

14. The method as claimed in claim 10, further comprising, between the adjusting the first duration of the superframe and the comparing the size of the maximum CTA:
    when a CTA requested by a device is asynchronous, determining whether an available CTA exists in the adjusted superframe and then waiting for a next superframe if the available CTA does not exist.

15. The method as claimed in claim 10, wherein the multiple is an integer multiple.

16. A method for allocating channel time to an application on a wireless personal area network (PAN) wherein an upper layer has frames and a lower layer has superframes existing at a media access control (MAC) layer, the method comprising:
    adjusting a first duration of a superframe of the superframes, to be substantially equivalent to an integral multiple of a second duration of a frame of the frames;
    outputting an adjusted superframe,
    comparing a size of a maximum channel time allocation (CTA) in a frame of the upper layer with a size of an isochronous CTA of a requesting device; and
    dividing the isochronous CTA by a value obtained by adding 1 to a quotient of the size of the isochronous CTA divided by the size of the maximum CTA, if it is determined that the size of the isochronous CTA of the requesting device is greater than the maximum CTA in the frame of the upper layer.

17. A method for allocating channel time to an application on a wireless personal area network (PAN) wherein an upper layer has frames and a lower layer has superframes existing at a media access control (MAC) layer, the method comprising:
    comparing a size of a maximum channel time allocation (CTA) in a frame of the upper layer with a size of an isochronous CTA of a requesting device; and
    dividing the isochronous CTA by a value obtained by adding 1 to a quotient of the size of the isochronous CTA divided by the size of the maximum CTA, if it is determined that the size of the isochronous CTA of the requesting device is greater than the maximum CTA in the frame of the upper layer.

* * * * *